(No Model.) 2 Sheets—Sheet 1.
G. W. GRAFFIN.
VALVE.
No. 586,433. Patented July 13, 1897.
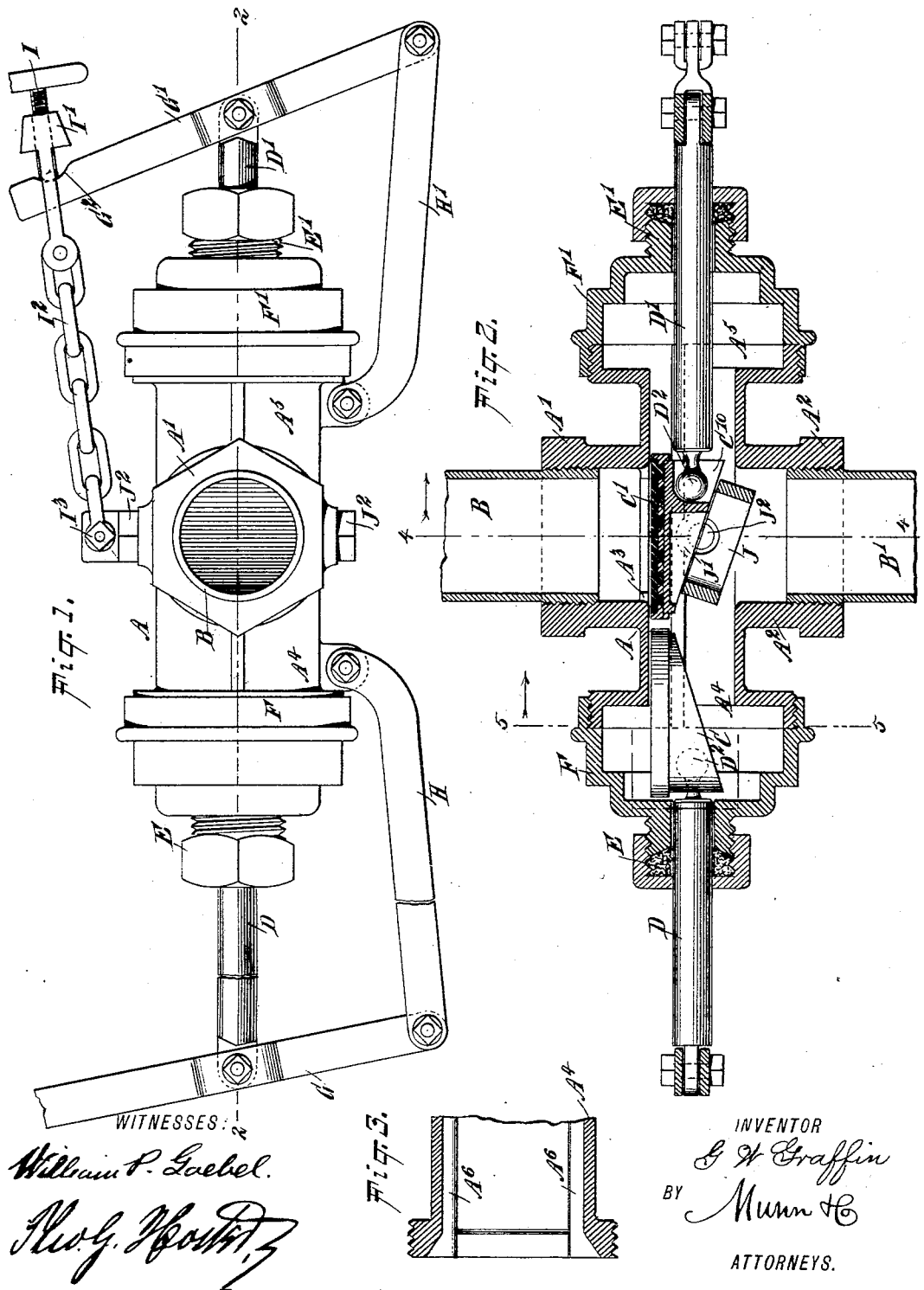
WITNESSES:
William P. Gaebel.
Theo. G. Hoster.
INVENTOR
G. W. Graffin
BY Munn & Co.
ATTORNEYS.

(No Model.) 2 Sheets—Sheet 2.
G. W. GRAFFIN.
VALVE.

No. 586,433. Patented July 13, 1897.

WITNESSES:
William P. Goebel.
Theo. G. Hoskins

INVENTOR
G. W. Graffin.
BY Munn & Co
ATTORNEYS.

UNITED STATES PATENT OFFICE.

GEORGE W. GRAFFIN, OF ALLENTOWN, PENNSYLVANIA.

VALVE.

SPECIFICATION forming part of Letters Patent No. 586,433, dated July 13, 1897.

Application filed November 2, 1895. Serial No. 567,686. (No model.)

*To all whom it may concern:*

Be it known that I, GEORGE W. GRAFFIN, of Allentown, in the county of Lehigh and State of Pennsylvania, have invented a new and Improved Valve, of which the following is a full, clear, and exact description.

The invention relates to valves such as shown and described in the Letters Patent of the United States No. 546,922, granted to me September 24, 1895.

The object of the present invention is to provide a new and improved valve which is simple and durable in construction, very effective in operation, and arranged to make a tight closure and to permit of conveniently repairing the working parts whenever required without dispensing with the services of the valve.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 4:
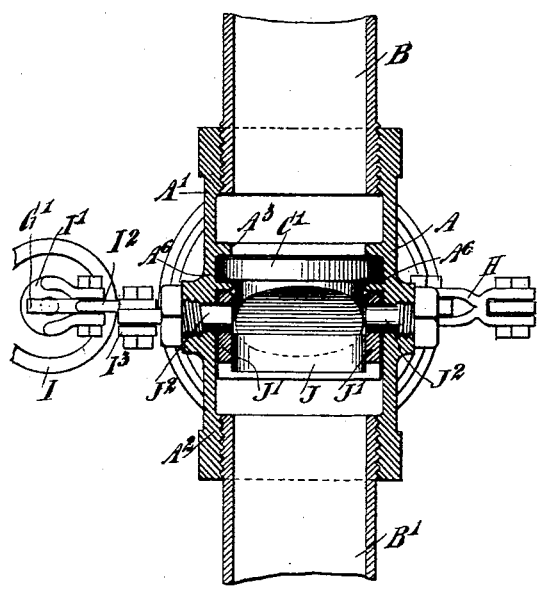
Figure 5:
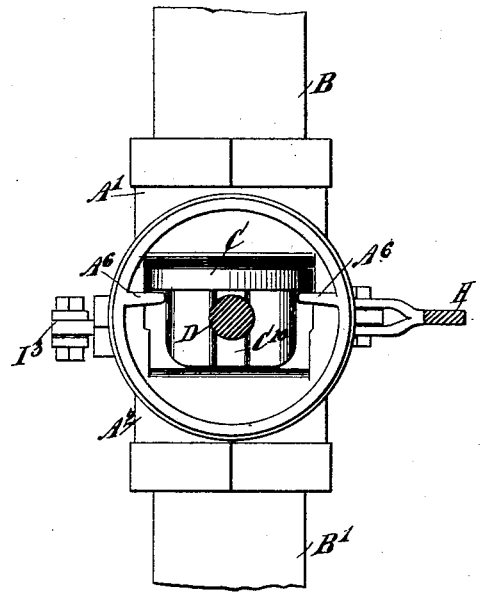
Figure 6:
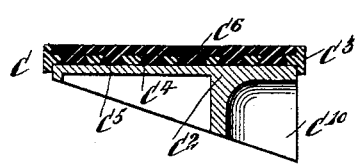
Figure 8:
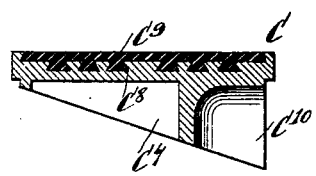
Figure 7:
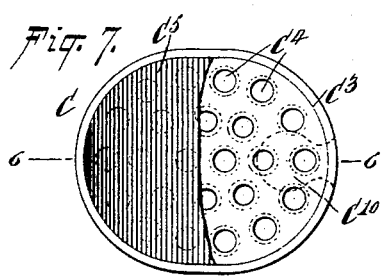

Figure 1 is a plan view of the improvement. Fig. 2 is a longitudinal section of the same on the line 2 2 of Fig. 1. Fig. 3 is a sectional plan view of one end of the valve-casing. Fig. 4 is a transverse section of the improvement on the line 4 4 of Fig. 2. Fig. 5 is a similar view of the same on the line 5 5 of Fig. 2. Fig. 6 is an enlarged side elevation of one of the valves proper, the section being taken on the line 6 6 of Fig. 7. Fig. 7 is a face view of the same with part of the packing broken out. Fig. 8 is a sectional side elevation of a modified form of the valve proper on the line 8 8 of Fig. 9, and Fig. 9 is a face view of the same with part of the packing broken out.

The valve is provided with an elongated casing A, formed on opposite sides with an inlet $A'$ and an outlet $A^2$, connected with inlet and outlet pipes B and $B'$, respectively, as is plainly shown in the drawings. On the inner end of the inlet $A'$ is formed a valve-seat $A^3$, adapted to be engaged by one of the valves proper, C or $C'$, to close said inlet whenever desired and disconnect the pipes B and $B'$.

The valves C and $C'$ are arranged in opposite ends $A^4$ and $A^5$, respectively, of the casing A, and said valves are adapted to be moved back and forth to open and close the valve-casing. Each of the valves C and $C'$ is formed with a body $C^2$, made wedge shape, as is plainly shown in Figs. 2 and 6, and on the face of the valve is arranged a disk $C^3$, adapted to be fastened to the body $C^2$ in any suitable manner. In the disk $C^3$ are formed a number of dovetailed or countersunk openings $C^4$, adapted to be engaged by correspondingly-shaped offsets $C^5$, formed integrally on the packing $C^6$, fitted in the said disk and adapted to be seated on the valve-seat $A^3$ at the time the corresponding valve C or $C'$ is in an innermost position. The packing $C^6$ is preferably made of vulcanized rubber, but other suitable material may be substituted, and this packing is directly vulcanized on the disk $C^3$, so that the offsets $C^5$ engage the dovetailed openings $C^4$ to securely hold the packing in place on the disk.

Figure 9:
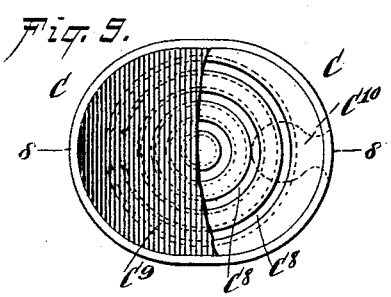

Instead of using the disk I may form dovetail grooves $C^8$ in the face of the body $C^7$, as shown in Figs. 8 and 9, said grooves being preferably circular and cut in the body by a lathe or other machine or cored in. The packing $C^9$ is vulcanized on the face of the body $C^7$, with integral offsets extending into said grooves $C^8$, so as to securely fasten the packing in place on the valve.

On one end of each of the valves C or $C'$ is formed a socket $C^{10}$, disposed vertically and rounded off at its inner end to receive a ball $D^2$, formed on the inner end of a valve-stem D or $D'$ for the corresponding valve C or $C'$. The stems D and $D'$ are fitted to slide longitudinally in the ends $A^4$ and $A^5$ of the casing A and pass through suitable stuffing-boxes E and $E'$, respectively, held on bonnets F and $F'$, respectively, screwing on the ends $A^4$ and $A^5$ of the casing.

The sides of the valves C and $C'$ are fitted to slide in suitable guideways $A^6$, formed on the inside of the casing, so that when the stems D and $D'$ are moved longitudinally the valves are moved forward and backward on the said guideways to open and close the valve-seat $A^3$, as previously mentioned. The valves are rather loose on the guideways to permit a lateral as well as a vertical movement of each valve on the respective ball $D^2$, so as to insure a proper seating of the valve on the seat $A^3$, it being understood that the ball-and-socket joint between the valve and its stem permits such a movement.

The outer ends of the stems D and D' are pivotally connected with levers G and G', respectively, connected by links H and H', respectively, with the casing A, so that the operator in pulling or pushing either of the levers G or G' can move the corresponding valve C or C' inward or outward in the casing to and from the valve-seat $A^3$. When a valve is in an innermost position—that is, seated on the seat $A^3$—then it can be locked in place by locking the corresponding lever G or G', and for this purpose I prefer a locking device consisting of a screw I, adapted to engage a recess $G^2$ in the free end of the lever G or G'. The screw I screws in a yoke I', held on a chain $I^2$, having its inner link $I^3$ fulcrumed on the casing A and near the middle thereof, so that the chain $I^2$ with its yoke I' and screw I can be used on either lever G or G' for the purpose previously mentioned.

The wedge-shaped back of each valve C or C' is adapted to engage an abutment J, formed on its sides with lugs or ears J', engaged by trunnions $J^2$, screwed or otherwise secured in the sides of the casing A, as is plainly illustrated in Fig. 4. The axis of the trunnions $J^2$ passes through the plane of the face of the abutment J, engaged by the wedge-shaped back of either of the valves C or C', so that the abutment J readily swings in position to engage the back of either of the valves and press the packing of the valve in firm contact with the valve-seat $A^3$.

In practice it has been found that with the center of the trunnions placed back of the face of the abutments, as in the construction shown in the patent above referred to, the valve will, when forced between the abutment and the seat, press harder on the one side of the seat than on the other. By having the center of the trunnions in line with the face of the abutment, as well as in line with the back face of the valve, as in the present construction, the front face of the valve is pressed against the valve-seat equally hard at all points.

By the arrangement described it will be seen that when the valve on the seat $A^3$ is unlocked and the other valve is pushed inward then the first valve is readily unseated and the second valve moves in position on the seat and also in contact with the abutment J, whereby a swinging motion is given to the abutment, so that the latter changes its position to properly engage the inwardly-moving valve. By this arrangement it is impossible that one of the valves is not moved into an outermost position when the other valve is moved to the seat, as might be the case in the construction shown in the patent above referred to.

Having thus fully described my invention, I claim as new and desire to secure by Letters Patent—

1. A valve provided with a trunnioned abutment having a face for engagement with a valve, the axis of the trunnions being in the plane of the said face, substantially as described.

2. A valve provided with two valves and a trunnioned abutment adapted to be engaged at its face by either of said valves, the axis of the trunnions being in the plane of the said face, substantially as shown and described.

3. A valve having a valve-seat and provided with a valve proper formed with a body having a wedge shape and fitted to slide loosely in suitable guideways, and a trunnioned abutment having a face for engagement with the said valve proper, the axis of the trunnions being in the plane of the said face, whereby the face of the valve proper is pressed against the valve-seat at all points with equal force, substantially as shown and described.

4. A valve provided with a valve proper comprising a body having dovetailed recesses formed on the face thereof, the projecting portions between said recesses being of greater diameter at the top than at the bottom and a packing having integral offsets engaging and filling the said recesses on the face of the valve and extending around and on top of the said projections, substantially as shown and described.

5. A valve provided with a valve proper comprising a body, a disk adapted to be secured to the face of said body and formed with dovetailed openings of less diameter at the top than the bottom, and a packing held in the said disk and forming a face for the body of the valve, the back of the packing being formed with integral offsets engaging and filling the said dovetailed openings in the disk, substantially as described.

6. A valve provided with an abutment having a face for engagement with the valve and having projections above said face trunnioned to the support, whereby the axis of said trunnions may be set in the plane of the face engaged by the valve, substantially as shown and described.

7. A valve provided with an abutment having a face for engagement by the valve, and having opposite lugs or portions projected above said face and provided with trunnion-openings formed partly in said lugs or portions, whereby the axis of the trunnions may lie in the plane of said face, substantially as shown and described.

8. A valve provided with an abutment having opposite upwardly-projected lugs and trunnions supporting said abutment and arranged with their axis in the plane of the upper face of the abutment and the valve movable between the said upwardly-projected lugs and engaging the upper face of the abutment, substantially as shown and described.

9. A valve comprising a casing having an inlet and an outlet, and provided with a valve-seat at said inlet, two valves proper movably mounted in said casing and adapted to be seated on said valve-seat, an abutment movably secured in the casing opposite the valve-seat, and adapted to be engaged by either of the said valves proper, slidable valve-stems having ball-and-socket connections with the valves proper, a lever connected with the outer end of each valve-stem, and a locking device connected with the casing near the middle thereof and adapted to engage either of said levers to lock the same when the respective valve is in the closed position, substantially as shown and described.

10. A valve comprising a casing having an inlet and an outlet and provided with a valve-seat at said inlet, two valves proper movably mounted in said casing and adapted to be seated on said valve-seat, slidable valve-stems connected with the valves proper, a lever connected with the outer end of each valve-stem and a locking device for the said levers comprising a screw adapted to engage either of the said levers, and a yoke connected with the casing and engaged by the said screw, substantially as shown and described.

11. A valve comprising a casing having an inlet and an outlet and provided with a valve-seat at said inlet, longitudinally-extending guideways each formed by a guide-rib and the side of the casing, the said guideways extending from one end of the casing to the other, valves adapted to be seated on the said valve-seat and fitted to slide loosely in the said guideways, whereby a lateral as well as a vertical movement of the valve is permitted, a slidable valve-stem for each valve, a ball-and-socket joint for connecting each valve with its valve-stem, and a movable abutment in the said casing opposite the said valve-seat and adapted to be engaged by either of the said valves, substantially as shown and described.

GEORGE W. GRAFFIN.

Witnesses:
T. M. SIMCOE,
EDWARD RUHE.